United States Patent [19]

Tsuchiya et al.

[11] Patent Number: 5,043,568

[45] Date of Patent: Aug. 27, 1991

[54] OPTICAL SIGNAL DETECTOR INCORPORATING MEANS FOR ELUMINATING BACKGROUND LIGHT

[75] Inventors: Yutaka Tsuchiya; Shinichiro Aoshima; Hironori Takahashi; Takuya Nakamura, all of Hamamatsu, Japan

[73] Assignee: Hamamatsu Photonics K. K., Shizuoka, Japan

[21] Appl. No.: 506,782

[22] Filed: Apr. 10, 1990

[30] Foreign Application Priority Data

Apr. 11, 1989 [JP] Japan .................................. 1-91506

[51] Int. Cl.⁵ ............................................. H01J 31/50
[52] U.S. Cl. ................................ 250/213 VT; 313/537
[58] Field of Search ....................... 250/213 VT, 207; 313/529, 532, 537

[56] References Cited

U.S. PATENT DOCUMENTS

| | | |
|---|---|---|
| 3,366,735 | 1/1968 | Hecker . |
| 3,751,586 | 8/1973 | Johansson . |
| 4,232,333 | 11/1980 | Hiruma et al. . |
| 4,352,127 | 9/1982 | Tsuchiya . |
| 4,611,920 | 9/1986 | Tsuchiya . |
| 4,645,918 | 2/1987 | Tsuchiya et al. . |
| 4,661,694 | 4/1987 | Corcoran . |
| 4,672,439 | 6/1987 | Florence et al. . |
| 4,694,154 | 9/1987 | Tsuchiya et al. . |
| 4,734,573 | 3/1988 | Dill ............................... 250/213 VT |
| 4,767,207 | 8/1988 | Takiguchi ..................... 250/213 VT |
| 4,797,747 | 1/1989 | Takiguchi et al. . |
| 4,945,224 | 7/1990 | Koishi et al. ................. 250/213 VT |

FOREIGN PATENT DOCUMENTS

| | | |
|---|---|---|
| 56-44622 | 10/1981 | Japan . |
| 57-40709 | 8/1982 | Japan . |
| 57-40712 | 8/1982 | Japan . |
| 59-58745 | 4/1984 | Japan . |
| 59-104519 | 6/1984 | Japan . |
| 59-134538 | 8/1984 | Japan . |
| 59-135330 | 8/1984 | Japan . |
| 61-183857 | 8/1986 | Japan . |
| 1436801 | 5/1976 | United Kingdom . |
| 2042163A | 9/1980 | United Kingdom . |
| 2044588A | 10/1980 | United Kingdom . |
| 2131165A | 6/1984 | United Kingdom . |
| 2133875B | 8/1984 | United Kingdom . |

OTHER PUBLICATIONS

Tsuchiya, Y. et al., "Synchroscan Streak Camera", SPIE Proceedings, vol. 348, Aug. 21-27, 1982, pp. 245-250.

Tsuchiya, Y. et al., "A New Picosecond Synchroscan Photometer", SPIE Proceedings, vol. 491, Aug. 27-31, 1984, pp. 224-229.

Tsuchiya, Y. et al., "Universal Streak Camera", SPIE Proceedings, vol. 491, Aug. 27-31; 1984, pp. 86-94.

Tsuchiya, Y. et al., "Sampling Optical Oscilloscope", SPIE Proceedings, vol. 348, Aug. 21-27, 1982, pp. 245-250.

Primary Examiner—David C. Nelms
Assistant Examiner—K. Shami
Attorney, Agent, or Firm—Finnegan, Henderson, Farabow, Garrett, and Dunner

[57] ABSTRACT

A first part of input light containing both background light and signal light is extracted by a sampling streak tube and converted to a first electric signal by a photodetector. A second part of the input light containing only background light is extracted by the same sampling streak tube by offsetting the sampling timing and converted to a second electric signal by the photodetector. A signal component corresponding to the signal light is extracted by taking the difference between the first and second electric signals. In one embodiment, the sampling timing is offset by applying a chopping voltage to chopping electrodes provided in the sampling streak tube.

10 Claims, 12 Drawing Sheets

OPTICAL SIGNAL DETECTOR INCORPORATING MEANS FOR ELUMINATING BACKGROUND LIGHT

BACKGROUND OF THE INVENTION

The present invention relates to an optical signal detector for detecting signal light superposed on a part of input light which contains background light. More particularly, the present invention relates to an optical signal detector with which an optical signal superposed on intense background light can be observed at high time resolution.

The transient behaviors of ultra-fast optical phenomena can be measured by a variety of means. One method is the use of a streak camera which is operated by the following principle: incident light is focused on a photocathode where the photons are converted to electrons; the photoelectron beam emitted from the photocathode is then swept at high speed by applying a deflection voltage; and thereby the temporal change in the intensity of the incident light is measured as the change in brightness associated with position on a phosphor screen.

Figure 19:
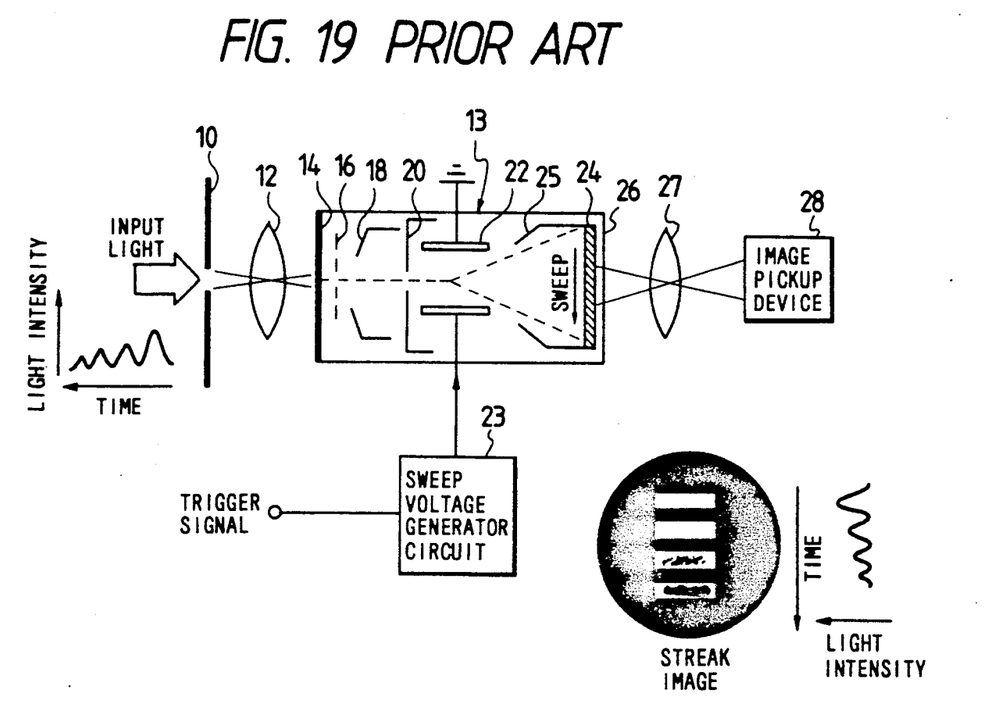
FIG. 19 is a longitudinal section showing an example of the basic construction of a prior art streak tube.

The heart of the streak camera is a streak tube which is generally indicated as 13 in FIG. 19 and which includes the following main components: a photocathode 14 where an optical image (slit image) focused at an entrance window through a slit plate 10 and a lens 12 in an input optical system is converted to an electron image; an accelerating electrode 16, typically in mesh form, which accelerates the electron image produced on the photocathode 14; (main) deflecting electrodes 22 by which the accelerated photoelectrons are swept at high speed in a direction perpendicular to the slit length direction (either upward or downward as viewed in the drawing); and a phosphor screen 26 on which the deflected photoelectron image is converted to an optical image (called "streak image" which carries brightness information with the lapse of time being expressed by position on the vertical axis), which emerges from an exit window.

The other components shown in FIG. 19 are as follows: a focusing electrode 18 by which the photoelectrons accelerated by the electrode 16 are converged to have a specified cross-sectional area; an anode 20 having an opening area in the center; a (main) sweep voltage generator circuit 23 which applies a predetermined (main) sweep voltage to the deflecting electrodes 22 in synchronism with the passage of electrons; a microchannel plate (MCP) 24 by which the electrons passing through the deflecting electrodes 22 are multiplied before they arrive at the phosphor screen 26; a cone-shaped shielding electrode 25 that is provided on the input side of MCP 24 and which improves the precision of measurements by blocking the electrons deflected to go outside the effective sweep range of phosphor screen 26; and an image pickup device 28 such as a high-sensitivity TV camera, e.g., a silicon intensified target (SIT) camera or a CCD camera, which picks up the streak image via a lens 27 in an output optical system.

Figure 20:
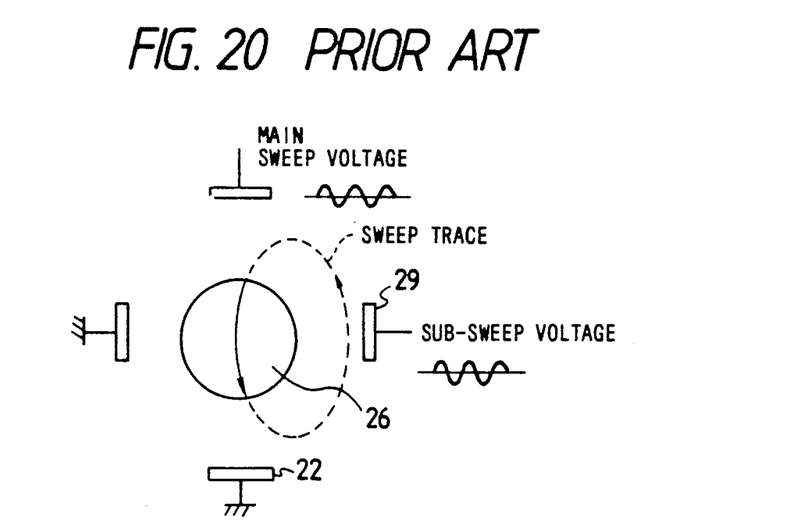
FIG. 20 is a cross-sectional view illustrating the operating principle of a prior art synchronous blanking streak tube.

Operating by the principles described above, streak cameras are roughly divided into two types according to the method of sweeping; namely, a single scan type and a synchroscan type. A single scan streak camera performs linear sweep with an ultra-fast sawtoothed wave repetitive at a rate not higher than several kilohertz in synchronism with pulse laser light. A synchroscan streak camera performs high-speed repetitive sweep with a sinusoidal wave synchronized with laser light pulses repetitive at 80-160 MHz. An improved version called a synchronous blanking streak camera has also been developed. As shown in FIG. 20, this camera has sub-deflecting electrodes 29 crossed with the main deflecting electrode 22 and performs elliptical sweep in such a way that retrace sweep is laterally shifted to avoid scanning on the phosphor screen 26, thereby insuring that a signal associated with main sweep is selectively measured in a correct way.

These prior art streak cameras are described in many patent documents such as Japanese Patent Nos. 1,149,098, 1,149,120 and 1,099,753, JP-A-59-58745 (the term "JP-A" as used herein means an "unexamined published Japanese patent application"), JP-A-61-183857, U.S. Pat. Nos. 4,232,333, 4,352,127, 4,611,920 and 4,661,694, British Patent Nos. 2,042,163, 2,044,588 and 2,131,165.

The use of streak cameras in measuring the transient behaviors of ultra-fast optical phenomena has the following advantages: first, it provides a purely electronic direct method having fast time resolution and high detection sensitivity; second it is capable of measuring single (non-repetitive) phenomena; third, the streak image which is inherently a two-dimensional image helps provide two-dimensional measurements such as time-resolved spectral measurements and space- and time-resolved measurements, as well as multi-channel measurements; and fourth, by properly selecting the materials of which the photocathode and entrance window are made, measurements over a broad spectral range extending from the near-infrared region through the vacuum ultraviolet region up to the X-ray region can be realized.

Figure 21:
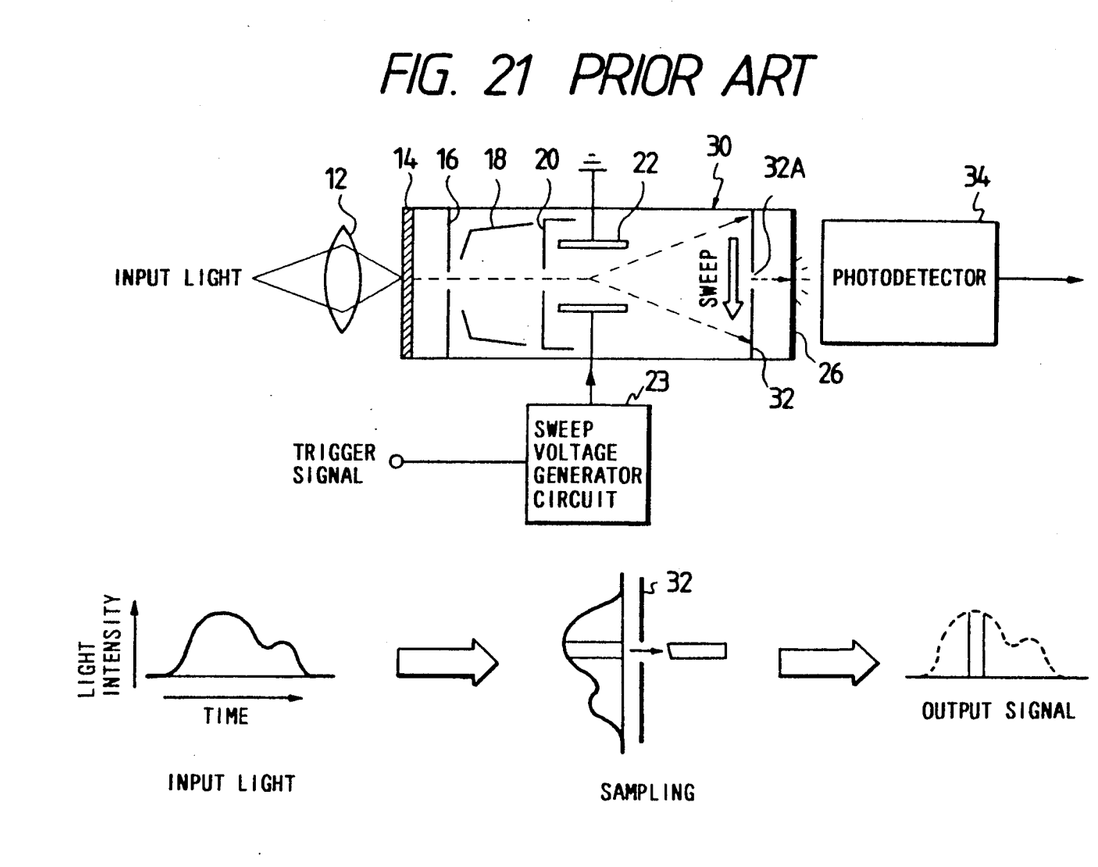
FIG. 21 is a longitudinal section showing an example of the basic construction of a prior art sampling streak tube.

A sampling optical oscilloscope has also been commercialized. As shown in FIG. 21, the streak image is electronically sampled with a sampling streak camera 30 in which a slit plate 32 having an electronic sampling slit 32A that limits said streak image spatially is provided typically in the streak tube. FIG. 21 also shows a photodetector 34 that detects the light emission intensity caused by electrons impinging on the phosphor screen 26 and may be composed of a photomultiplier tube, a high-sensitivity photodiode, an avalanche photodiode, a PIN photodiode, etc. This sampling optical oscilloscope is described in such patent documents as JP-A-59-104519, JP-A-59-134538, JP-A-59-135330, U.S. Pat. Nos. 4,645,918 and 4,694,154, and British Patent No. 2,133,375.

However, all of the prior art streak cameras described above perform immediate photoelectric conversion on input light and it has been difficult to observe with these cameras the waveform of signal light superposed on intense background light (dc light).

SUMMARY OF THE INVENTION

The principal object, therefore, of the present invention is to solve the aforementioned problem of the prior art by providing an optical signal detector with which signal light superposed on a part of input light which contains background light can be detected for observation purposes.

This object of the present invention can be attained by an optical signal detector for detecting signal light superposed on a part of input light which contains background light, which detector includes first photoelectric converting means that extracts the part of input light containing both background light and signal light at high time resolution and which converts the extracted part to an electric signal, second photoelectric converting means that extracts the part consisting of only background light and not containing signal light at high time resolution and which converts the extracted part to an electric signal, and means for extracting the component solely composed of signal light on the basis of the difference between the electric signal for the part containing signal light and the electric signal for the part consisting of only background light.

In one embodiment, the first -photoelectric converting means comprises a sampling streak tube and the second photoelectric converting means produces the electric signal for the part of input light consisting of only background light by offsetting the timing of sampling with the sampling streak tube.

In another embodiment, the timing of sampling with the sampling streak tube is offset by applying a chopping voltage to chopping deflecting electrodes.

In still another embodiment, the timing of sampling with the sampling streak tube is offset by applying a chopping voltage in superposition on a sub-sweep voltage applied to subsweep deflecting electrodes.

In a further embodiment, the timing of sampling with the sampling streak tube is offset by changing the phase of a sub-sweep voltage applied to sub-sweep deflecting electrodes.

In another embodiment, the timing of sampling with the sampling streak tube is offset by changing the amount of delay of a main sweep voltage to be applied to main sweep deflecting electrodes.

In yet anther embodiment, the first and second photoelectric converting means are a plurality of electronic sampling slits provided independently of one another in a sampling streak tube.

In accordance with the present invention, the part of input light containing both background light and signal light is extracted at high time resolution and converted to an electric signal. At the same time, the part of input light consisting of only background light and not containing signal light is also extracted at high time resolution and converted to an electric signal. Hence, the component of input light solely composed of signal light can be extracted on the basis of the difference between the electric signal for the part containing signal light and the electric signal for the part consisting of only background light, and this insures that even signal light superposed on intense background light (dc light) can be observed at high time resolution. As a result, the optical signal detector of the present invention enables measurements of light absorption and many other optical measurements that have previously been considered difficult to perform.

When a sampling streak tube is used as the first photoelectric converting means, the electric signal for the part of input light which consists of only background light can be readily obtained by offsetting the timing of sampling with this sampling streak tube.

The timing of sampling with the sampling streak tube may be offset by applying a chopping voltage to chopping deflecting electrodes and this offers the advantage of eliminating the need to alter a sub-sweep voltage.

If the timing of sampling with the sampling streak tube is offset by applying a chopping voltage in superposition on a sub-sweep voltage applied to a sub-sweep deflecting electrodes, this eliminates the need to provide chopping deflecting electrodes.

The timing of sampling with the sampling streak tube may also be offset by changing the phase of a sub-sweep voltage applied to sub-sweep deflecting electrodes, and this eliminates the need to generate a chopping voltage.

If the timing of sampling with the sampling streak tube is offset by changing the amount of delay of a main sweep voltage to be applied to main sweep deflecting electrodes, the optical signal detector of the present invention can be easily constructed using a commercially available sampling optical oscilloscope.

In another embodiment, the first and second photoelectric converting means may be a plurality of electronic sampling slits provided independently of one another in a sampling streak tube. In this case, the electric signal for the part of input light containing signal light and the electric signal for the part consisting of only background light can be obtained independently of each other without performing chopping.

DESCRIPTION OF THE PREFERRED EMBODIMENTS

Several embodiments of the present invention are described below in detail with reference to the accompanying drawings.

Figures 1, 2:
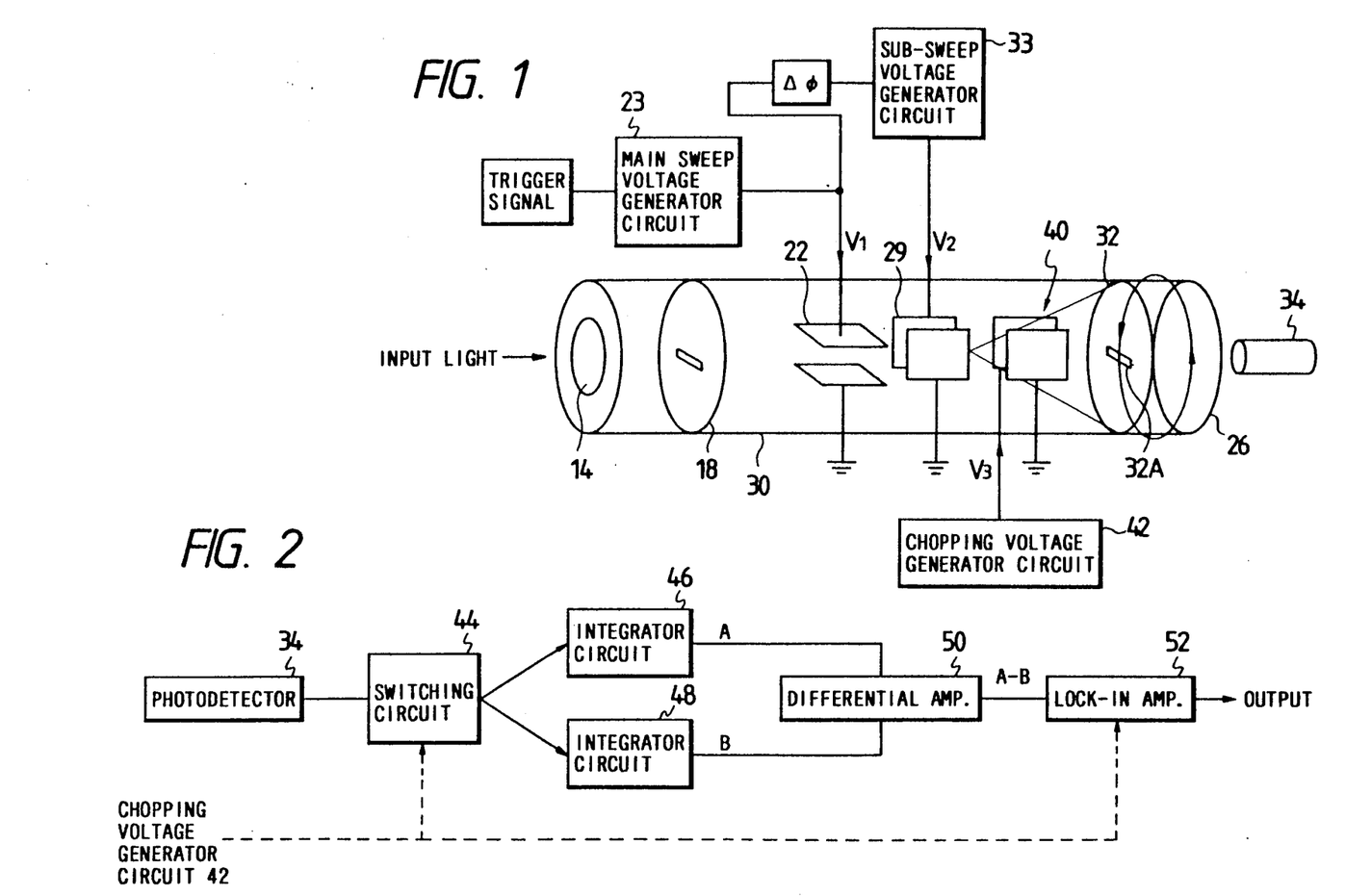
FIG. 1 is a perspective view showing the general construction of an optical signal detector according to a first embodiment of the present invention, with part shown by a block diagram.
FIG. 2 is a block diagram showing the construction of the signal processing circuit used in the first embodiment.

A first embodiment of the present invention relates to a sampling streak camera which is generally indicated by 30 in FIG. 1 and which contains a photocathode 14, an anode 18, main deflecting electrode 22, sub-deflecting electrodes 29, a slit plate 32 and a phosphor screen as main components. According to the first embodiment, chopping deflecting electrodes 40 are provided in the tube and a chopping voltage $V_3$ as supplied from a chopping voltage generator circuit 42 is applied to the electrodes 40 so as to offset the timing of sampling with an electronic sampling slit 32A in the slit plate 32. By so doing, an electric signal for the part of input light containing signal light S and an electric signal consisting of only background light N can both be obtained by a single photodetector (e.g., photomultiplier tube) 34.

The system shown in FIG. 1 also includes a main sweep voltage generator circuit 23 for generating in response to a trigger signal a main sweep voltage $V_1$ to be applied to the main deflecting electrodes 22 in synchronism with the input light to be measured, and a sub-sweep voltage generator circuit 33 for generating a sub-sweep voltage $V_2$ whose phase is different from the main sweep voltage by a predetermined difference $\Delta\phi$.

The output of the photodetector 34 is processed with a signal processing circuit which, as shown in FIG. 2, may comprise the following components: a switching circuit 44 for switching the output of the photodetector 34 in synchronism with the timing of the change in the chopping voltage produced by the chopping voltage generator circuit 42; integrator circuits 46 and 48 by which an electric signal for the part of input light containing signal light S and an electric signal for the part consisting of only background light N and not containing signal light are respectively integrated in accordance with the switching state of the switching circuit 44; a differential amplifier 50 for amplifying the difference between outputs A and B from the respective integrators 46 and 48; and a lock-in amplifier 52 that amplifies an output (A−B) from the differential amplifier 50 at the frequency (chopping frequency) of the timing change in the chopping voltage being supplied from the chopping voltage generator circuit 42 with a narrow bandwidth and outputs the amplified signal.

The optical signal detector according to the first embodiment of the present invention will operate in the following manner.

Figure 3:
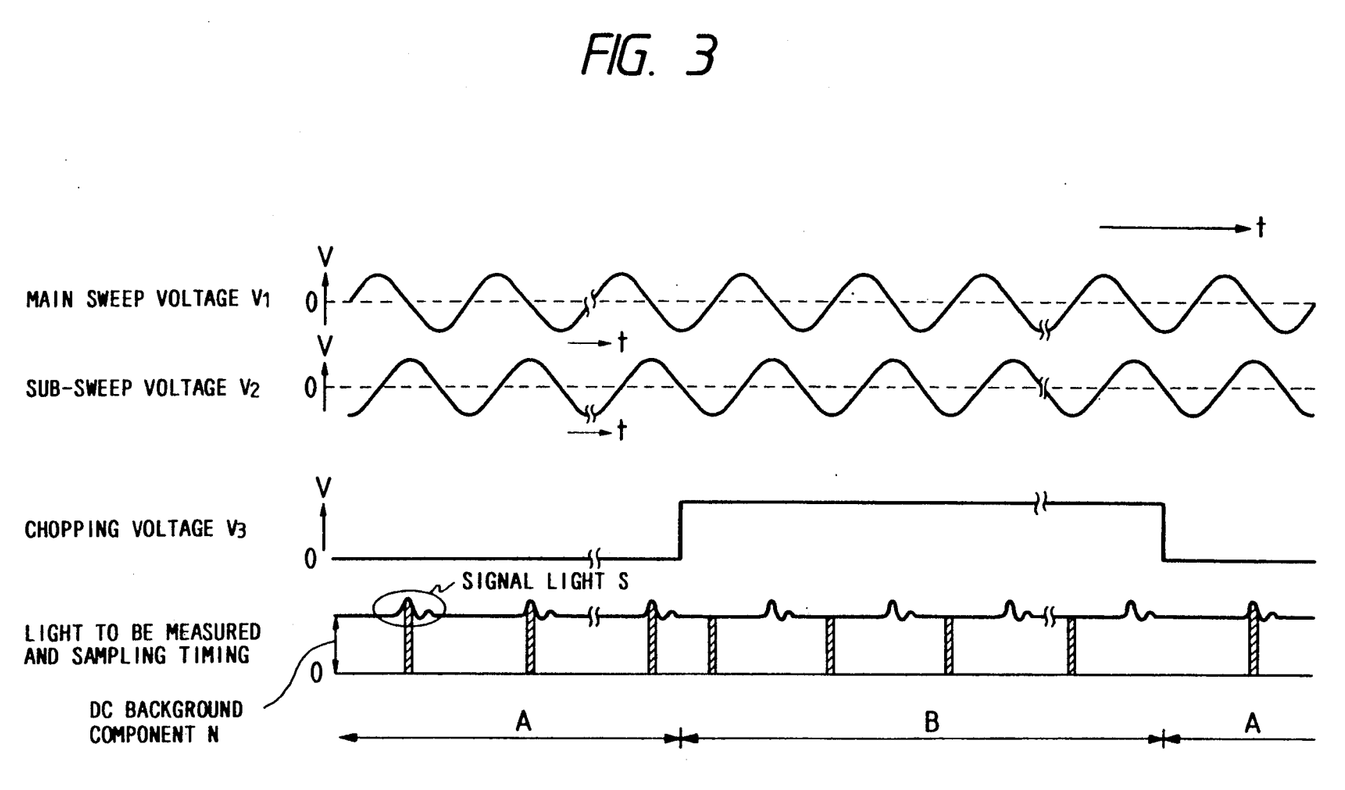
FIG. 3 is a diagram showing an example of the waveforms of signals generated at various parts of the system according to the first embodiment.
Figure 4A:
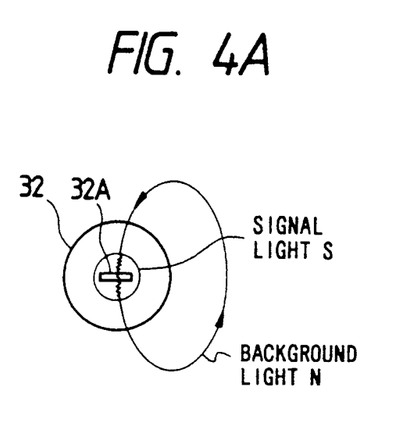
FIGS. 4A and 4B are front views showing how signal light and background light, respectively, are sampled with an electronic sampling slit.
Figure 4B:
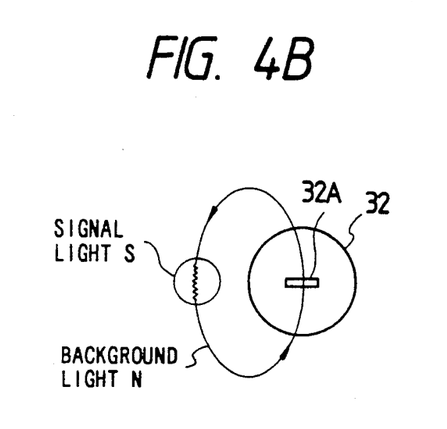

An example of the relationship, as applicable in the first embodiment, among the main sweep voltage $V_1$, sub-sweep voltage $V_2$, chopping voltage $V_3$, light to be measured (input light), and the timing of sampling is shown in FIG. 3. In zone A where the chopping voltage $V_3$ is not applied ($V_3=0$), the photodetector 34 receives an optical signal for the part containing both the background light N and signal light S that has been sampled with the electronic sampling slit 32A as in the prior art (see FIG. 4A). In zone B where the chopping voltage $V_3$ is applied, the photodetector 34 receives an optical signal for the part consisting of only the background light N and not containing the signal light (see FIG. 4B).

The outputs produced by the photodetector 34 in zones A and B are integrated by the integrator circuits 46 and 48, respectively, and are then amplified by the differential amplifier 50, in the signal processing circuit. Thus, unwanted signal of the background light (dc component) N is rejected from the signal of the light to be measured. The output of the differential amplifier 50 is fed to the lock-in amplifier 52, where the chopping frequency component of the signal is amplified with a narrow bandwidth. Thus, the noise component is rejected from the output of the photodetector 34 to thereby provide an improved S/N ratio. These operations, accompanied by gradual change in the timing of sampling, will insure that the entire waveform of the input light can be obtained at high time resolution.

In the first embodiment where the chopping deflecting electrodes 40 are used, one need only apply sweep voltages to the main deflecting electrodes 22 and the sub-deflecting electrodes 29 in the usual manner. The use of lock-in amplifier 52 contributes to a higher S/N ratio but this may be omitted if so desired.

Figure 5:
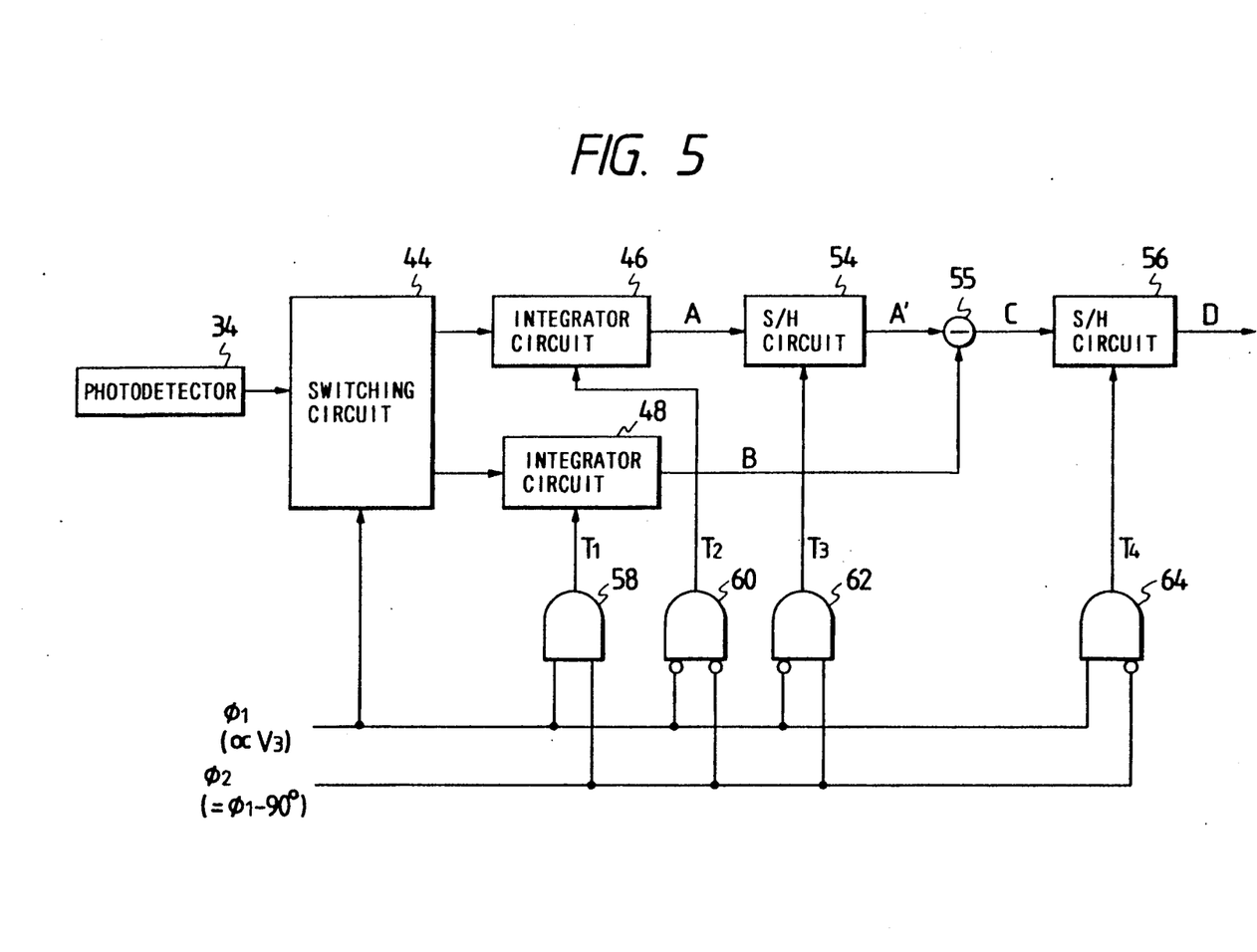
FIG. 5 is a circuit diagram showing a specific example of the construction of the signal processing circuit used in the first embodiment.

A specific configuration of the signal processing circuit for processing the output of the photodetector 34 is shown in FIG. 5 and may comprise the following components: a switching circuit 44; two integrator circuits 46 and 48; two sample-and-hold circuits 54 and 56; a subtractor 55; and four AND gates 58, 60, 62 and 64 for supplying appropriate circuits with a clock signal $\phi_1$ having the same waveform as the chopping voltage $V_3$ and a clock signal $\phi_2$ delayed in phase by 90° with respect to the clock signal $\phi_1$.

Figure 6:
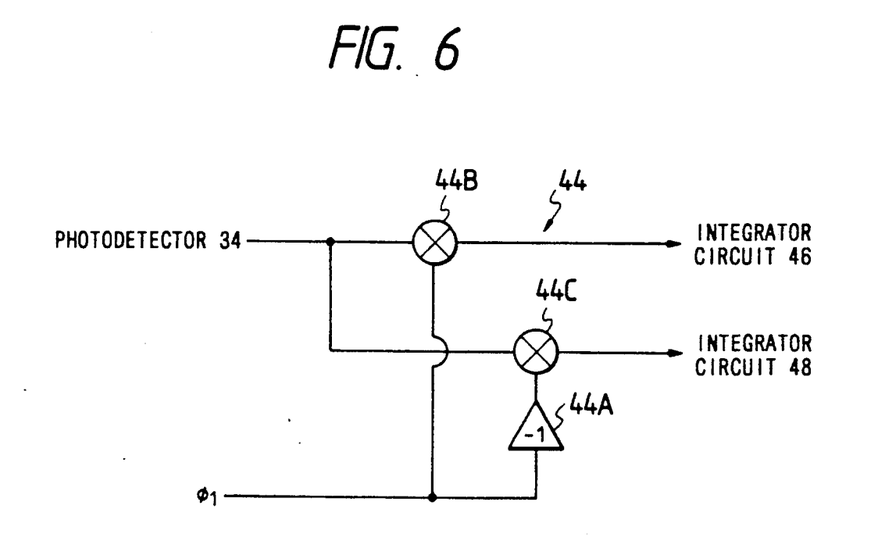
FIG. 6 is a circuit diagram showing a specific example of the switching circuit in the signal processing circuit.

As shown in FIG. 6, the switching circuit 44 may be composed of an invertor 44A and two multipliers 44B and 44C.

Figure 7:
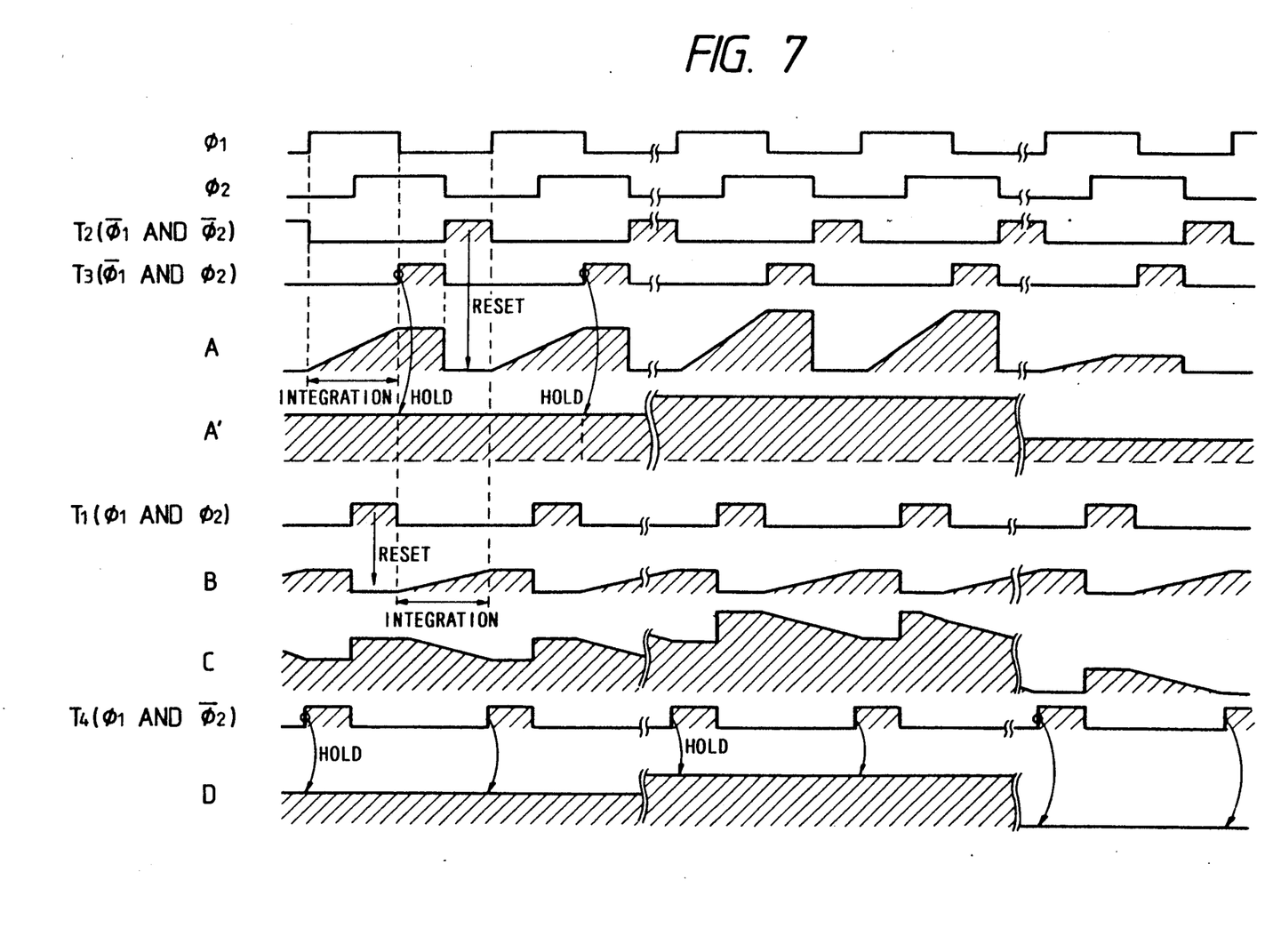
FIG. 7 is a diagram showing an example of the waveforms of signals generated at various parts of the signal processing circuit shown in FIG. 5.

An example of the waveforms of signals generated at various parts of the signal processing circuit when the chopping voltage has a duty factor of 50% is shown in FIG. 7.

A second embodiment of the present invention is described below in detail.

Figure 8:
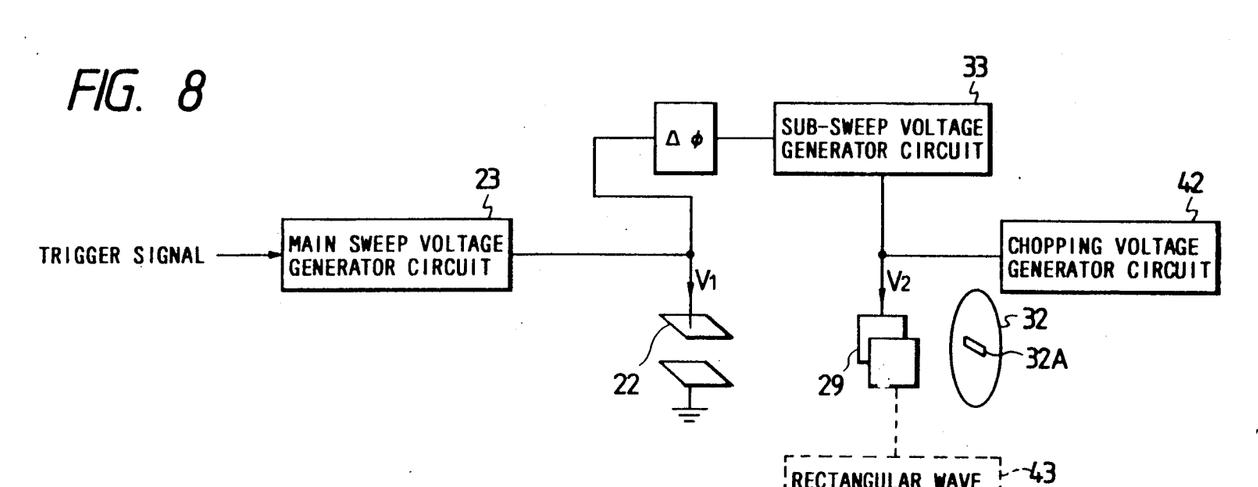
FIG. 8 is a perspective view showing the construction of the essential part of an optical signal detector according to a second embodiment of the present invention.

As shown in FIG. 8, this embodiment is the same as the first embodiment except that no chopping deflecting electrode is provided in the sampling streak tube 30 and instead a chopping voltage supplied from the chopping voltage generator circuit 42 is applied in superposition on the sub-sweep voltage being applied to the sub-deflecting electrodes 29. If desired, the chopping voltage generator circuit 42 may be replaced by a rectangular wave generator circuit 43 as indicated by a dashed line in FIG. 8.

Figure 9:
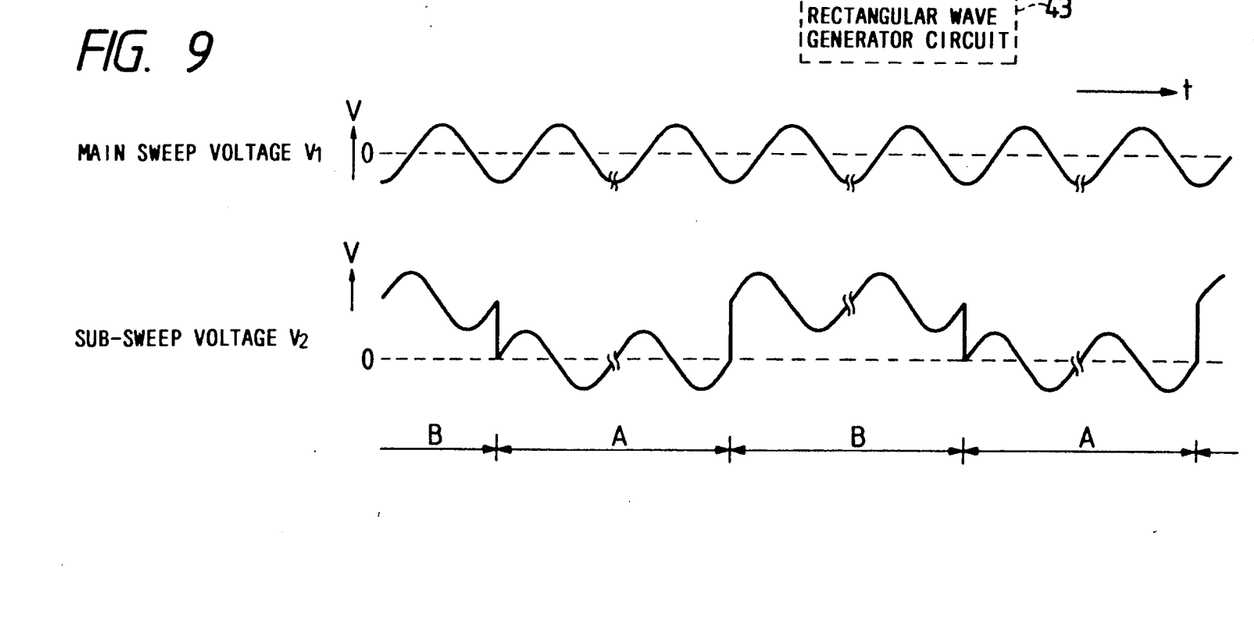
FIG. 9 is a diagram showing an example of the relationship between a main sweep voltage and a sub-sweep voltage as applied in the second embodiment.

An example of the relationship between the main sweep voltage $V_1$ and sub-sweep voltage $V_2$ as applied in the second embodiment is shown in FIG. 9.

The other features of the second embodiment are the same as those of the first embodiment and hence will not be described here. According to this second embodiment, the timing of sampling with the sampling streak tube can be offset without providing separate chopping deflecting electrodes.

A third embodiment of the present invention is described below in detail.

Figure 10:
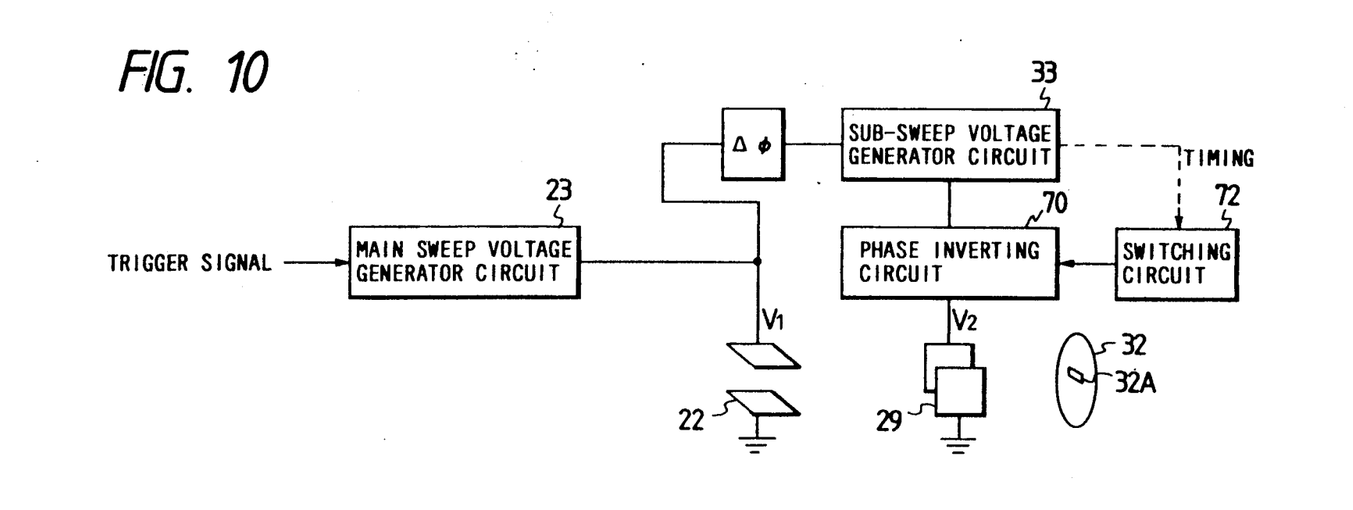
FIG. 10 is a perspective view showing the construction of the essential part of an optical signal detector according to a third embodiment of the present invention.

As shown in FIG. 10, this embodiment is the same as the second embodiment except that the chopping voltage generator circuit is replaced by a phase inverting circuit 70 and a switching circuit 72 which are separately connected to the sub-sweep voltage generator circuit 33. The sub-deflecting electrodes 29 are supplied with the output of the sub-sweep voltage generator circuit 33 through the phase inverting circuit 70, where the phase is inverted (180° change) at the timing determined by the switching circuit 72. This technique is also effective in producing two electric signals, one for the part of input light containing signal light S and the other for the part consisting of only background light N.

Figure 11:
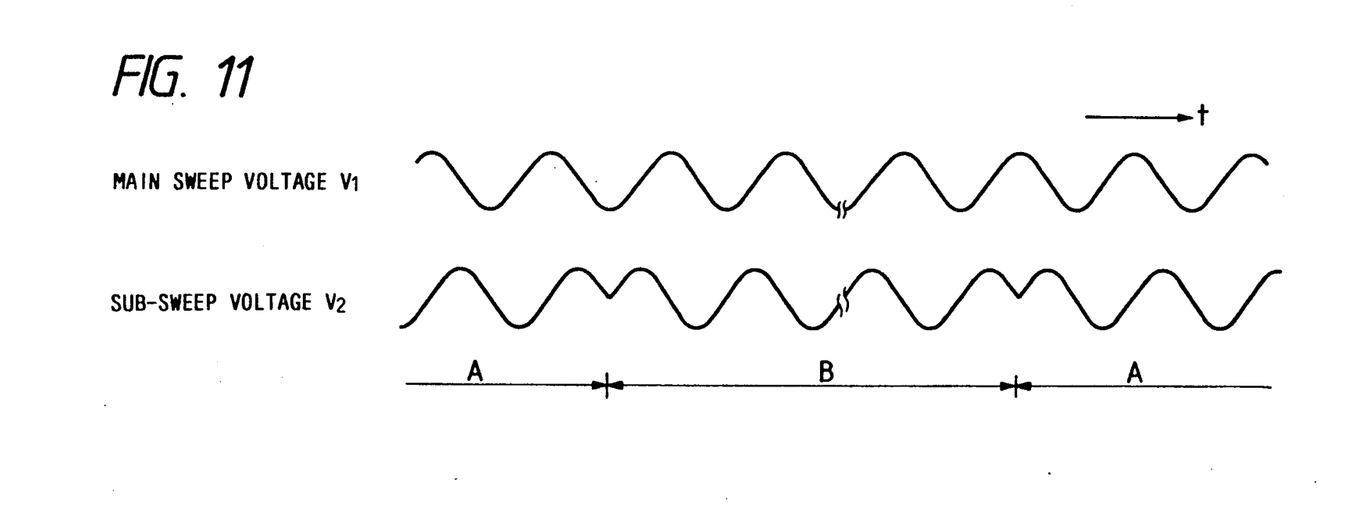
FIG. 11 is a diagram showing an example of the relationship between a main sweep voltage and a sub-sweep voltage as applied in the third embodiment.

An example of the relationship between the main sweep voltage $V_1$ and sub-sweep voltage $V_2$ as applied in the third embodiment is shown in FIG. 11.

The other features, including operational aspects, of the third embodiment are essentially the same as those of the first and second embodiments and hence will not be described here. The major advantage of the third embodiment is that a separate chopping voltage generator circuit need not be provided.

A fourth embodiment of the present invention is described below in detail.

Figure 12:
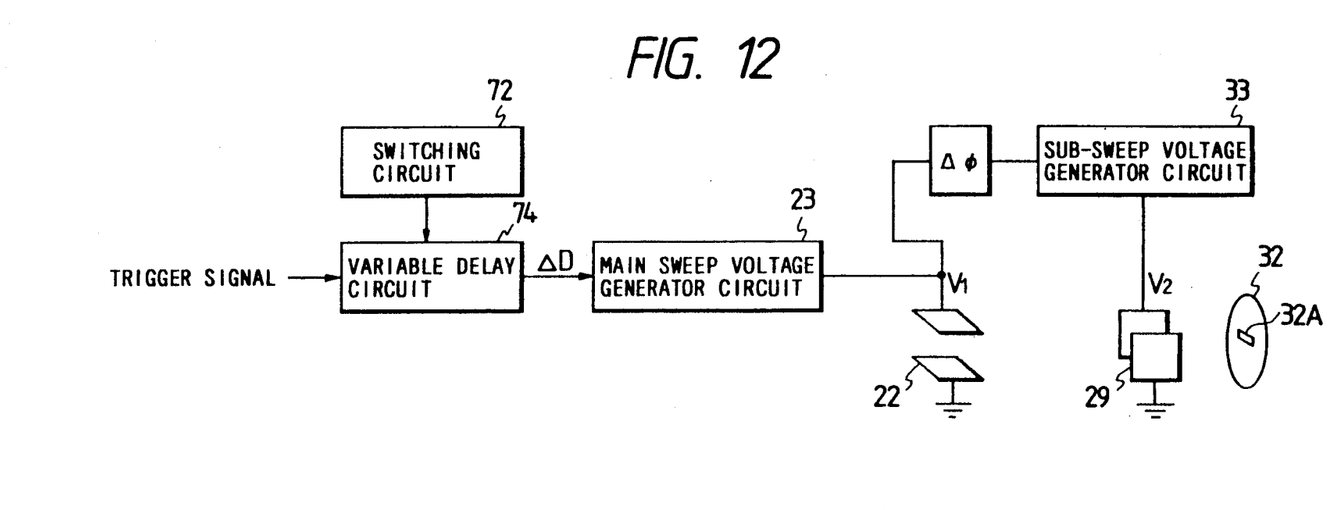
FIG. 12 is a perspective view showing the construction of the essential part of an optical signal detector according to a fourth embodiment of the present invention.

As shown in FIG. 12, this embodiment is the same as the second embodiment except that the chopping voltage generator is replaced by a variable delay circuit 74 provided before the main sweep voltage generator circuit 23. The amount of delay provided by the variable delay circuit 74 is changed by a switching circuit 72 to produce both an electric signal for the part of input light containing signal light S and an electric signal for the part consisting of only background light N.

Figure 13:
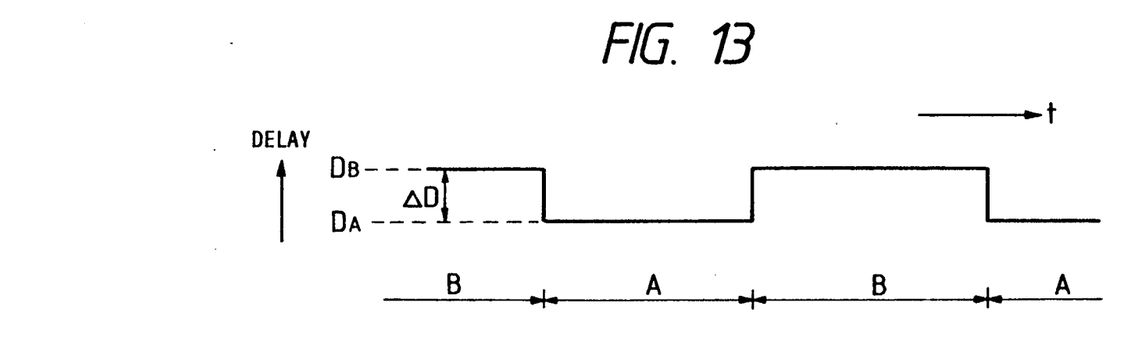
FIG. 13 is a diagram illustrating how the amount of delay is changed in the fourth embodiment.

An example of the relationship between $D_A$ or the amount of delay of timing with which light containing signal light S is obtained, and $D_B$ or the amount of delay of timing with which background light N is obtained, as applicable in the fourth embodiment, is shown in FIG. 13. If the input light is repetitive at 100 MHz, a change of the amount of delay, $\Delta D$, may be adjusted to 5 nanoseconds and this permits the system to be operated in the same manner as the previous embodiments.

The fourth embodiment offers the advantage of realizing the present invention in an easy way since the components of the sampling streak tube 30 downstream of the main sweep voltage generator circuit 23 are identical to those of a conventional sampling optical oscilloscope. If desired, the variable delay circuit 74 may be incorporated in the main sweep voltage generator circuit 23 to form an integral unit.

A fifth embodiment of the present invention is described below in detail.

Figure 14:
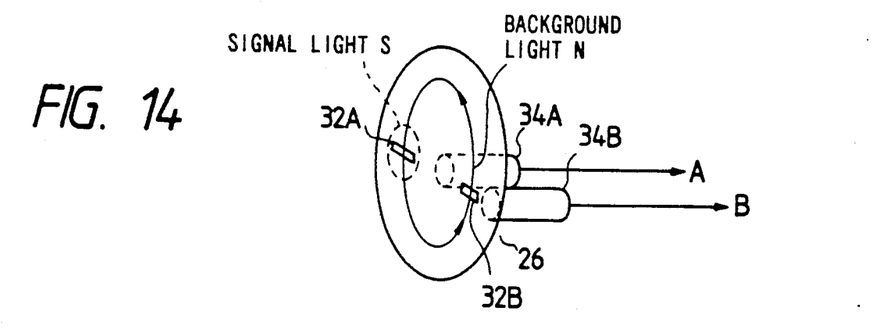
FIG. 14 is a perspective view showing the construction of the essential part of an optical signal detector according to a fifth embodiment of the present invention.

As shown in FIG. 14, this embodiment is the same as the first embodiment except that the slit plate 32 in the sampling streak tube 30 is provided with two electronic sampling slits 32A and 32B by which the part of input light containing signal light S and the part consisting of only background light N can be extracted independently of each other. These sampling slits are respectively associated with two photodetectors 34A and 34B.

Figure 15:
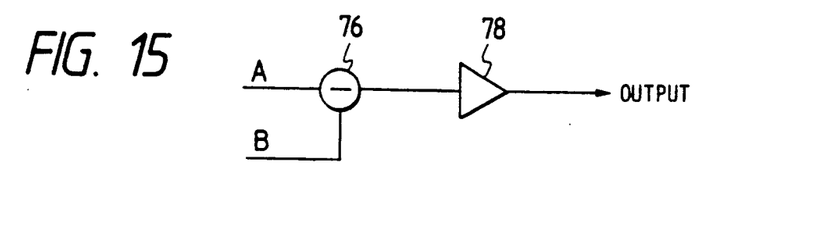
FIG. 15 is a diagram showing an example of the signal processing circuit used in the fifth embodiment.

As shown in FIG. 15, a signal processing circuit of use in the fifth embodiment may be composed of a subtractor 76 and an amplifier 78, which may be combined as an integral unit in the form of a differential amplifier.

This embodiment, where the light containing the signal component S can be sampled and detected independently of the light consisting of only the background component N, obviates the need to perform chopping, and hence. signal processing can be accomplished with a very simple circuit of the configuration shown in FIG. 15.

If desired, the signal obtained in the circuit shown in FIG. 15 may be chopped for lock-in detection.

Figure 16:
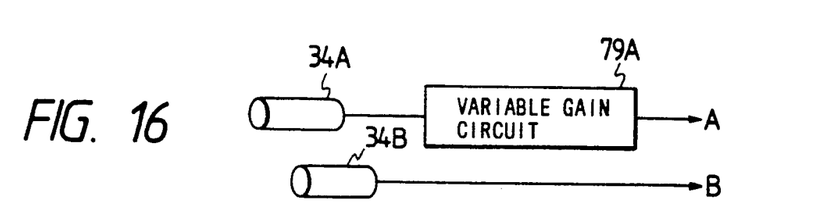
FIG. 16 is a block diagram showing the construction of the essential part of a modification of the fifth embodiment.

FIG. 16 shows a modification of the fifth embodiment in which a variable gain circuit 79A is provided subsequent to the first photodetector 34A. In this modification, dc light such as that from a flashlight is supplied to the optical signal detector while it is operated and the variable gain circuit 79A is adjusted in such a way that its output signal A becomes equal to the output signal B of the second photodetector 34B.

Figure 17:
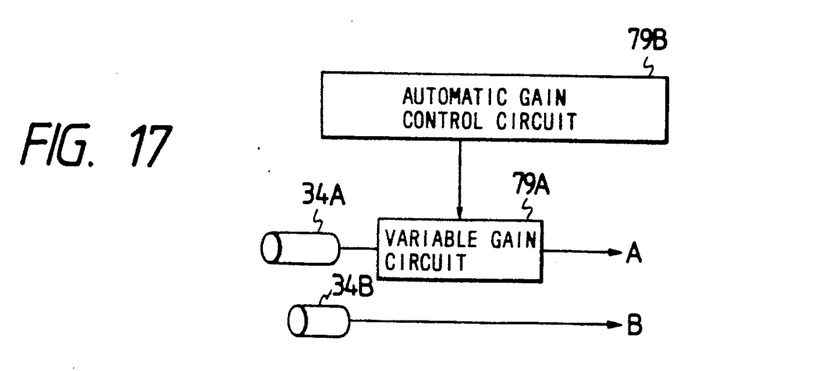
FIG. 17 is a block diagram showing the construction of the essential part of another modification of the fifth embodiment.

FIG. 17 shows another modification of the fifth embodiment in which the variable gain circuit 79A is automatically adjusted with an automatic gain control circuit 79B.

In the two modifications, the variable gain circuit 79A is provided subsequent to the first photodetector 34A but it may be provided subsequent to the second photodetector 34B. If desired, the variable gain circuit 79A may be provided subsequent to each of the first and second photodetectors.

Further, each of the first to fourth embodiments described above may be so modified that a variable gain circuit is additionally provided, for example, subsequent to either one or both of the integrator circuits 46 and 48 shown in FIG. 2. A variable gain circuit may also be provided subsequent to the photodetector 34 so that gain control is performed in synchronism with the chopping voltage.

Figure 18:
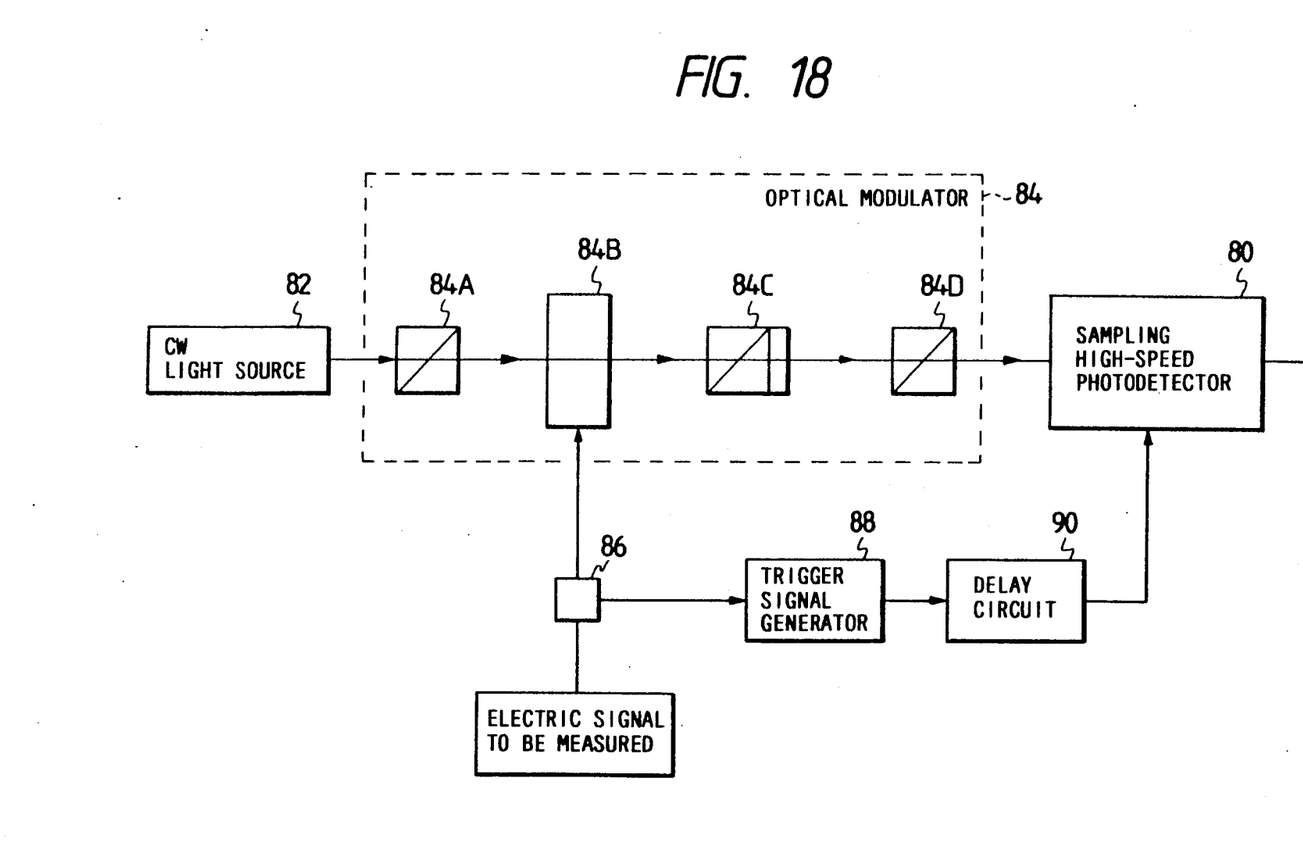
FIG. 18 is a block diagram showing an example of the construction of a voltage detector to which various embodiments of the present invention may be applied.

The optical signal detector according to the various embodiments of the present invention may be used as a sampling high-speed photodetector in a voltage detecting apparatus of a type that utilizes an electrooptical effect in which the refractive index varies with the voltage in a selected site of an object to be measured. An example of the use of the optical signal detector in this application is shown in FIG. 18 where the optical signal detector is indicated by 80. The other components of the system shown in FIG. 18 are as follows: a CW light source 82; an optical modulator 84 comprising a polarizer 84A, an electrooptic crystal 84B which is either placed in the neighborhood of an object to be measured so as to cause a change in its refractive index in response to the voltage in a selected site of said object or which is directly supplied with the voltage to be measured, a compensator 84C and an analyzer 84D; a branching device 86 which divides the electric signal to be measured into two parts, one of which is supplied to the electrooptic crystal 84 in the optical modulator 84 while the other part is supplied into a trigger signal generator 88; and a delay circuit 90 which drives the sweep voltage generator circuit in the sampling high-speed photodetector 80 according to the present invention after delaying the trigger signal from the trigger signal generator 88 by a predetermined amount.

The foregoing description of the present invention assumes that it is applied to a synchroscan photometer or a sampling optical oscilloscope which are provided with a sampling streak tube, but it will be readily apparent to one skilled in the art that these are not the sole examples of the use of the present invention and that it can equally be applied to ordinary streak tubes having no slit plate, as well as to an apparatus having other photoelectric converting means.

What is claimed is:

1. An optical signal detector for detecting signal light superposed on input light which contains background light, comprising:
    a photoelectric converter including
        first extracting means for extracting a first part of the input light containing both the background light and the signal light at high time resolution,
        first converting means for converting the extracted first part to a first electric signal,
        second extracting means for extracting a second part of the input light containing the background light but not containing the signal light at high time resolution, and
        second converting means for converting the extracted second part to a second electric signal; and
    means for extracting a signal component on the basis of a difference between the first and second electric signals.

2. The optical signal detector of claim 1, wherein the photoelectric converter further includes a sampling streak tube having a single electronic slit, and wherein the second extracting means cooperates with the second converting means to produce the second electric signal by offsetting a sampling timing of the sampling streak tube.

3. The optical signal detector of claim 2, wherein the sampling streak the comprises chopping deflecting electrodes, and the sampling timing is offset by applying a chopping voltage to the chopping deflecting electrodes.

4. The optical signal detector of claim 2, wherein the sampling timing is offset by applying a chopping voltage in superposition on a sub-sweep voltage applied to sub-sweep deflecting electrodes.

5. The optical signal detector of claim 2, wherein the sampling timing is offset by changing a phase of a sub-sweep voltage applied to sub-sweep deflecting electrodes.

6. The optical signal detector of claim 2, wherein the sampling timing is offset by changing a delay amount of a main sweep voltage applied to main sweep deflecting electrodes.

7. The optical signal detector of claim 1, wherein the photoelectric converter further includes a sampling streak tube, wherein the first and second extracting means are a plurality of electronic sampling slits provided independently of one another in a sampling streak tube, and wherein the first and second converting means includes a corresponding plurality of independent photodetectors.

8. The optical signal detector of claim 1, further comprising a lock-in amplifier for amplifying the difference between the first and second electric signals.

9. The optical signal detector of claim 1, further comprising a variable gain circuit in at least one of the first and second converting means.

10. The optical signal detector of claim 9, further comprising an automatic gain control circuit for automatically adjusting a gain of the variable gain circuit.

* * * * *